3,850,881
STABILIZATION OF POLYMERS CONTAINING
ESTER LINKAGES
Guenther Kurt Hoeschele, Wilmington, Del., assignor to
E. I. du Pont de Nemours and Company, Wilmington,
Del.
No Drawing. Filed Apr. 30, 1973, Ser. No. 355,943
Int. Cl. C08g 51/62
U.S. Cl. 260—45.75 N     8 Claims

ABSTRACT OF THE DISCLOSURE

A segmented thermoplastic copolyetherester containing intralinear long chain and short chain ester units is stabilized by the presence of (1) a diaryl amine, and (2) an effective amount of a nickel salt of a Schiff base.

Background of the Invention

Linear copolyesters have been produced heretofore for various purposes, particularly for the production of films and fibers, but the known polymers of this type have not been effective as would be desired for certain applications. In particular certain polymers of this type do not possess superior tear strength, tensile strength, flex life and abrasion resistance which would be required for many uses such as hydraulic hose and cable coverings. Recently, a copolyetherester has been discovered which possesses such properties. Although this copolyetherester is significantly superior to those previously known in the art in many regards, it has presented something of a problem with regard to resistance to thermal degradation. That is to say, with prolonged exposure to temperatures of above 120° C. the copolyetherester has tended to degrade. For applications such as those in the hydraulic hose and wire insulation fields, where temperatures above 120° C. and up to at least 180° C. are often encountered, an improvement in the thermostability of the copolyetherester is necessary to avoid this problem of thermal degradation.

Summary of the Invention

According to this invention there is provided an improved copolyetherester composition which has greatly enhanced resistance toward thermal degradation of the polymer, in particular degradation at temperatures of about 120 to 200° C. This improvement is accomplished by incorporating into the polymer; (1) an effective amount of a diaryl amine which is present as such in a physical mixture with the copolyetherester and (2) a nickel salt of a Schiff base derived from salicyl aldehyde and an aromatic amine. The nickel salt is added blending after the copolyetherester is formed. The diaryl amine may be present during the formation of the copolyetherester or blended after formation.

The copolyetherester polymer which is to be improved by the instant invention consists essentially of a multiplicity of recurring intralinear long-chain and short-chain ester units connected head-to-tail through ester linkages, said long-chain ester units being represented by the following structure:

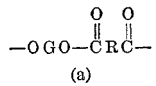

(a)

and said short-chain ester units being represented by the following structure:

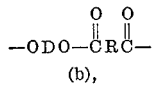

(b), wherein:

G is a divalent radical remaining after removal of terminal hydroxyl groups from poly(alkylene oxide) glycols having a carbon-to-oxygen ratio of about 2.0–4.3 and molecular weight between about 400 and 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the provisos that the short-chain ester units constitute about 15–95% by weight, preferably 25–90% by weight, of the copolyetherester and, ergo, the long-chain ester units constitute about 5 to 85% by weight, preferably 10–75% by weight, of the copolyetherester.

Polymers other than copolyetherester containing poly(alkylene oxide) units can also be stabilized by the combination of diaryl amine and nickel salt.

Detailed Description

The term "long-chain ester units" as applied to units in a polymer chain refers to the reaction product of a long-chain glycol with a dicarboxylic acid. Such "long-chain ester units," which are a repeating unit in the copolyetheresters of this invention, correspond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol).

The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein refers to carboxylic acids having two carboxyl groups each attached to a saturated carbon atoms. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4 - cyclohexane dicarboxylic acid, adipic acid, glutaric acid, succinic acid, carbonic acid, oxalic acid, azelaic acid, diethyl-malonic acid, allyl-malonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'bicyclohexyl dicarboxylic acid, decahydro-2,6-naphthalene dicarboxylic acid, 4,4'-methylenebis-(cyclohexane carboxylic acid), 3,4 - furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane p-oxy(p-carboxyphenyl) benzoic acid, ethylene-bis(p-oxybenzoic acid), 1,5 - naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is preferred that at least about 50% of the short segments are identical and that the identical segments form a homopolymer in the fiber-forming molecular weight range (molecular weight >5000) having a melting point of at least 150° C. and preferably greater than 200° C. Polymers meeting these requirements exhibit a useful level of properties such as tensile strength and tear strength. Polymer melting points are conveniently determined by differential scanning calorimetry.

The short-chain ester units will constitute about 15–95 weight percent of the copolyetherester. The remainder of the copolyetherester will be the long segments, ergo the long segment will comprise about 5–85 weight percent of the copolyetherester. Copolyetheresters in which the short-chain units comprise 25–90 weight percent with 10–75 weight percent long-chain units are preferred.

The copoyestherester is modified by the presence of an effective amount, that is to say from about 0.2 up to about 5.0 weight percent of diaryl amine and an effective amount of a nickel salt of a Schiff base, e.g., from about 0.1 up to about 3.0 weight percent of the nickel salt of the Schiff base. Preferred ranges are about 0.5 to 3.0 weight percent for the amine and about 0.25 to 2.0 weight percent for the nickel salt of the Schiff base.

The general formula for the diaryl amines is as follows:

$$ArNHAr^1$$

wherein Ar and $Ar^1$ are phenyl, substituted phenyl, $\alpha$- or $\beta$-naphthyl or substituted $\alpha$- or $\beta$-naphthyl radicals wherein the substituents are selected from $C_1$–$C_{18}$ alkyl, $C_1$–$C_{18}$ alkoxy, $C_6$–$C_{16}$ aryl, $C_6$–$C_{16}$ aryloxy and $C_2$–$C_{19}$ carboalkoxy radicals. Ar and $Ar^1$ may be the same or different.

Representative diaryl amines are as follows:

Diarylamines such as phenyl naphthylamines, octylated diphenylamine, 4,4' - dimethoxydiphenylamines, 4,4'-bis ($\alpha,\alpha$ - dimethylbenzyl)diphenylamine and 4 - isopropoxy-diphenylamine;

p-Phenylenediamine derivatives such as N,N' - bis-1-methylheptyl-p-phenylenediamine, N,N'-di-beta-naphthyl-p-phenylenediamine, N,N' - diphenyl-p-phenylenediamine, N - cyclohexyl-N'-phenyl-p-phenylenediamine, and N-sec-butyl-N'-phenyl-p-phenylenediamine.

Diphenyl amine derivatives in which Ar and $Ar^1$ are both phenyl or substituted phenyl radicals are preferred. Illustrative of these are octylated diphenylamine and 4-isopropoxy-diphenylamine. Especially preferred as the diaryl amine is 4,4'-bis($\alpha,\alpha$-dimethylbenzyl)diphenylamine which is sold under the trademark Naughard® and is a product of Uniroyal, Inc.

The other element which is present along with the copolyetherester and the substituted diaryl amine is a nickel salt or complex. The nickel compounds are salts or complexes of certain Schiff bases in which the Schiff base is essentially that formed by the condensation of salicyl aldehyde and a substituted aromatic amine such as substituted aniline or amino pyridine as illustrated by the following general formula:

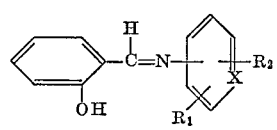

wherein $R_1$ as well as $R_2$ are selected from the group consisting of hydrogen, halogen, alkyl, alkoxy and carboalkoxy and X is CH or N.

Most preferably $R_1$ and $R_2$ may be hydrogen, halogen, $C_1$ to $C_6$ alkyl, $C_1$ to $C_6$ alkoxy and $C_2$ to $C_7$ carboalkoxy. Examples of Schiff bases employed in the present invention within the scope of the above formula are as follows:

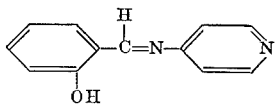
Salicylidene-4-aminopyridine

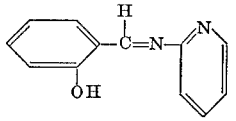
Salicylidene-2-aminopyridine

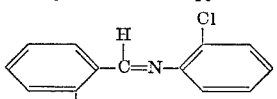
Salicylidene-2-chloraniline

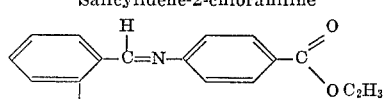
Salicylidene-4-carboethoxyaniline

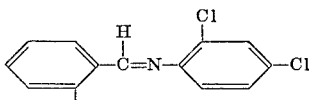
Salicylidene-2,4-dichloroaniline

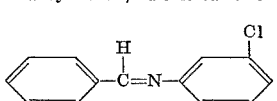
Salicylidene-3,5-dichloroaniline

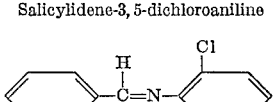
Salicylidene-2,5-dichloroaniline

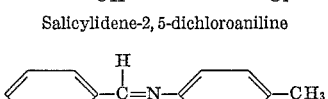
Salicylidene-4-methylaniline

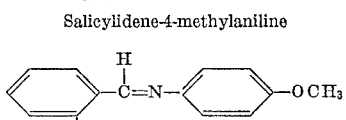
Salicylidene-4-methoxyaniline

The copolyesters described herein can be made conveniently by a conventional ester interchange reaction. Other polymerization techniques as described in U.S. Pat. 3,023,192 to Shivers are useful for specific polymers. A preferred procedure involves heating the dicarboxylic acid, e.g., dimethyl ester of terephthalic acid with a long chain glycol, e.g., poly(tetramethylene oxide)glycol having a molecular weight of about 600–2,000 and a molar excess of diol, e.g., 1,4-butanediol in the presence of a catalyst at about 150–260° C. and a pressure of 0.5 to 5 atmospheres, preferably ambient pressure, while distilling off methanol formed by the ester interchange. Depending on temperature, catalyst, glycol excess, and equipment, this reaction can be completed within a few minutes e.g., 2 minutes to a few hours, e.g., 2 hours.

Concerning the molar ratio of reactants, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyetherester units. Best results are usually obtained when this final distillation or polycondensation is run at less than about 5 mm. pressure and about 200–270° C. for less than about two hours, e.g., 0.5 to 1.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used alone or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2% by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butane diol in terphenyl, are conveniently removed during high polymerization by azeotropic distillation. Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

Most preferred copolyesters which are stabilized by the process of this invention are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers. The polymers based on poly(tetramethylene oxide) glycol are especially preferred because they are easily prepared, have over-all superior physical properties, and are especially resistant to water.

The most preferred copolyetherester compositions also contain (A) from 0.5 to 3.0 weight percent of a diaryl amine, preferably 4,4'-bis($\alpha,\alpha$-dimethylbenzyl)diphenylamine and (B) from about 0.25 to 2.0 weight percent of the nickel salt of a Schiff base, preferably Schiff bases derived from salicyl aldehyde and 2-chloroaniline, 2,4-dichloroaniline and 2,5-dichloroaniline.

The nickel salt and the diaryl amine may be blended with the completed copolyetherester product. It is, however, preferred to add the diaryl amine during the polycondensation aspect of the reaction in an amount of at least about 0.2 percent by weight based on the estimated yield of copolyetherester product, preferably in an amount of 0.5 to 3.0 percent by weight. It is preferred that the diaryl amine be present at any point in the process where the poly(alkylene oxide) glycol is exposed to elevated temperatures, e.g., above about 100° C. The diaryl amine, depending on its melting point, may be added as a solid, a molten liquid, or as a solution or dispersion in one or more of the reactants. In batch operation, it is conveniently added as a solid or as a solution or dispertion in the diol or the poly(alkylene oxide) glycol at the time of charging the reactor. In continuous operation, it is most conveniently added as a solution or dispersion in the diol and/or glycol entering the process. The diaryl amine may, of course, be introduced at later stages in the process and even after preparation of the copolyetherester is complete. It is usually convenient to add the total amount of diaryl amine desired in the finished copolyetherester during its preparation; however, additional amounts of diaryl amine can be added to the finished copolyetherester by melt blending.

During the preparation of the copolyetherester the diaryl amine prevents oxidative degradation (resulting from air inleakage) of the reactants and the polymer as it is being formed. The diaryl amine does not interfere with transesterification or interact with transesterification catalysts. Because oxidative degradation is substantially eliminated during the polymerization, a more uniform product of higher quality, as indicated by improved inherent viscosity, is obtained. The color of the product is also superior.

The nickel salt is added after the copolyetherester is prepared. Alternatively, the diaryl amine may also be added at that time by standard milling techniques.

The nickel salt can be added to the finished copolyetherester by the following illustrative procedures. For best results, the two components must be thoroughly and uniformly blended, otherwise localized areas will differ in properties. The compositions may be prepared by adding the nickel salt to copolyetherester which has been heated to a temperature sufficient to soften or melt the copolyetherester and agitating until the nickel salt is incorporated. The temperature required to soften or melt the copolyetherester depends on the particular copolyetherester, but generally will be in the range of 150–280° C. Generally, it is preferred to use the lowest temperature which will permit the means of agitation available to be effective; however, with high melting copolyetheresters higher temperatures may be required. For example, if agitation is limited to that provided by a close-fitting paddle stirrer in a kettle, the copolyetherester will have to be heated somewhat above its melting point to lower its viscosity. If more powerful agitation is available such as that provided by heated rubber mills, internal mixers (Banbury mixer) or single or twin screw extruders, temperatures near the softening point or melting point of the copolyetherester can be used. If desired, solvents or plasticizers can be used to assist in mixing the nickel salt with the copolyetherester at lower temperatures. A particularly convenient procedure for preparing the compositions consists of dry blending the nickel salt with the copolyetherester in granular or pellet form and incorporating the nickel salt into the copolyetherester in an extruder.

The resulting product has improved resistance to oxidative degradation at temperatures in excess of 120° C. The preferred compositions of this invention can be employed at temperatures as high as 180° C. for extended periods of time.

Illustrative uses for the compositions include hydraulic hose tubes and covers, wire and cable insulation and gaskets requiring high service temperatures. Use of the compositions in the presence of solvents such as hydraulic fluids does not interfere with the ability of the compositions to resist degradation.

Properties of these heat stabilized copolyetherester compositions can also be modified by incorporation of various conventional organic fillers, such as carbon black, silica gel, alumina, clays and chopped fiber glass. White or light colored fillers are preferred with the non-discoloring compositions of this invention. In general, these additives have the effect of increasing the modulus of the material at various elongations. Compounds having a range of hardness values can be obtained by blending hard and soft copolyetheresteres of this invention.

All parts, proportions and percentages disclosed herein are by weight unless otherwise indicated.

The following examples further illustrate the invention:

The following ASTM methods are employed in determining the properties of the polymers prepared in the examples which follow:

Modulus at 100% elongation,[1] $M_{100}$ _____ D 412
Modulus at 300% elongation,[1] $M_{300}$ _____ D412
Modulus at 500% elongation,[1] $M_{500}$ _____ D 412
Tensile at Break,[1] $T_B$ _____ D 412
Elongation at Break,[1] $E_B$ _____ D 412
Hardness, Shore D _____ D 1484
Heat Aging [2] _____ D 865
Fluids Resistance _____ D 471

[1] Crosss-head speed 2"/minute if noot stated otherwise.
[2] All heat aging experiments were carried out with dumbbell shaped test specimens as described in ASTM D 412. If not stated otherwise, the thickness of the test specimens was 45–48 mil.

The useful polymer life at the specified aging temperatures is determined by the 180° bend test. In this test the dumbbell shaped test specimen as described in ASTM method D 412, is removed from the heat aging tubes and kept at room temperature for about 10 minutes. Then the dumbbell is bent first in one direction until its ends touch each other and then bent in the opposite direction until the ends touch again. If the test specimen breaks during this procedure, it is said to have failed in the 180° bend test.

Inherent viscosities of the polymers in the following examples are measured at 30° C. at a concentration of 0.1 g./dl. in m-cresol.

The following catalyst is used in preparing the copolyesters of the examples:

CATALYST

To 425 parts of anhydrous 1,4-butanediol in a round bottom flask is added 23.32 parts of tetrabutyl titanate. The mixture is agitated at 50° C. for 2-3 hours until the small amount of solids originally present disappear.

*Copolyester A* is prepared by placing the following materials in an agitated flask fitted for distillation:

| | Parts |
|---|---|
| Polytetramethyleneether glycol; number average molecular weight about 975 | 9.7 |
| 1,4-Butanediol | 30.0 |
| Dimethyl terephthalate | 36.1 |
| Dimethyl phthalate | 6.95 |
| 4,4'-bis (alpha, alpha-dimethylbenzyl) diphenylamine | 0.61 |
| Catalyst | 1.22 |

A stainless steel stirrer with a paddle cut to conform with the internal radius of the flask is positioned about ⅛" from the bottom of the flask and agitation is started. The flask is placed in an oil bath at 160° C. agitated for five minutes and then the catalyst is added. Methanol distills from the reaction mixture as the temperature is slowly raised to 250° C. over a period of one hour. When the temperature reaches 250° C., the pressure is gradually reduced to 0.3 mm. Hg within 20 minutes. The polymerization mass is agitated at 250° C. 0.15 mm. Hg for 49 minutes. The resulting viscous molten product is scraped from the flask in a nitrogen (water and oxygen free) atmosphere and allowed to cool. The inherent viscosity of the product at a concentration of 0.1 g./dcl. in m-cresol at 30° C. is 1.53. Samples for heat aging and physical testing are prepared by compression molding at about 240° C. for one minute and cooling rapidly in the press. The polymer has a Shore D hardness of about 63.

*Copolyester B* containing a lower proportion of short chain ester units is prepared by substantially the same procedure from the following materials:

| | Parts |
|---|---|
| Polytetramethyleneether glycol: number average molecular weight about 975 | 10.75 |
| 1,4-Butanediol | 28.0 |
| Dimethyl terephthalate | 36.45 |
| Dimethyl phthalate | 3.65 |
| 4,4'-bis (alpha, alpha-dimethylbenzyl) diphenylamine | 0.57 |
| Catalyst | 1.1 |

The polymer has an inherent viscosity of 1.35 and a Shore D hardness of 63.

*Copolyester B* containing a lower proportion of short chain ester units is prepared by substantially the same procedure from the following materials:

| | Parts |
|---|---|
| Polytetramethyleneether glycol; number average molecular weight about 975 | 38.5 |
| 1,4-Butanediol | 36.5 |
| Dimethyl terephthalate | 60.0 |
| 4,4'-bis(alpha,alpha-dimethylbenzyl) diphenylamine | 1.05 |
| Catalyst | 2.1 |

The polymer has an inherent viscosity of 1.40 and a Shore D hardness of 55.

The nickel compound used in the following examples is derived from salicylidene-2-chloroaniline and was prepared according to the procedure given by C. H. Fuchsman in U.S. 3,303,162. (Hereinafter referred to as Nickel Stabilizer A.)

EXAMPLE 1

(A) Copolyester A (55 parts is charged to the reactor described above and heated at 240° C. under nitrogen until melted. Then, Nickel Stabilizer A (0.55 part) is added and the mixture is agitated for 5 minutes.

(B) For control purposes Copolyester A is prepared according to the procedure given above except that 4,4'-bis (alpha, alpha-dimethylbenzyl) diphenylamine is omitted. After the polymerization is completed, the vacuum is released under nitrogen and Nickel Stabilizer A (0.60 part) is mixed in by agitation at 240° C. for 5 minutes.

(C) Copolyester A is used without modification as another control polymer.

Dumbbell shaped test specimen of all three polymer compositions are heat aged at 150° C.; the pertinent results are summarized in Table I.

TABLE I

| | Polymer 1A | Control polymer 1B | Control polymer 1C |
|---|---|---|---|
| Original properties: | | | |
| Inherent viscosity, dl./g | 1.54 | 1.50 | 1.53 |
| $M_{100}$, p.s.i | 2,500 | 2,550 | 2,300 |
| $M_{300}$, p.s.i | 3,750 | 3,800 | 3,400 |
| $M_{500}$, p.s.i | | 7,650 | 6,875 |
| $T_B$, p.s.i | 7,500 | 7,650 | 8,400 |
| $E_B$, percent | 475 | 500 | 550 |
| Hardness | 63 | 63 | 63 |
| Properties after heat aging at 150° C. for 2 wks.: | | | |
| $M_{100}$, p.s.i | | (¹) | 2,650 |
| $M_{300}$, p.s.i | | (¹) | 2,700 |
| $T_B$, p.s.i | | (¹) | 2,750 |
| $E_B$, percent | | (¹) | 480 |
| Properties after heat aging at 150° C. for 5 wks.: | | | |
| $M_{100}$, p.s.i | 2,680 | | (²) |
| $M_{300}$, p.s.i | 2,700 | | (²) |
| $T_B$, p.s.i | 2,700 | | (²) |
| $E_B$, percent | 360 | | (²) |
| 180° Bend Test | Passed | | Failed |
| Polymer life ³ at 150° C., days | 67 | <14 | 35 |

¹ Completely degraded.
² Too brittle for testing.
³ Based on 180° Bend Test.

The data show that the combination of Nickel Stabilizer A with a diarylamine type antioxidant (Polymer 1A) stabilizes the polyetherester very effectively against oxidative degradation while neither of the two stabilizers when used alone offer much protection.

Example 2

Above preparation of Copolyester B is repeated except that 4,4'-bis (alpha, alpha-dimethylbenzyl) diphenylamine is substituted by the antioxidants shown in Table II. The amine stabilizers are either added with the other starting materials or mixed in at the end of the polymerization after releasing the vacuum under nitrogen. In all preparations 1% of Nickel Stabilizer A (0.55 part) is incorporated into the polymerization mixture as described in Example 1.

TABLE II

| Antioxidant | Antioxidant level, wt. percent | Method of preparation |
|---|---|---|
| A. Phenyl-alpha-naphthylamine | 1.0 | Post addition. |
| B. Phenyl-beta-naphthylamine | 1.0 | Do. |
| C. Dioctyl diphenylamine | 1.0 | Addition with starting materials. |
| D. N,N'-diphenyl-p-phenylene diamine. | 1.0 | Post addition. |
| E. Sym-di-beta-naphthyl phenylene diamine. | 1.0 | Addition with starting materials. |
| F. Polymerized 1,2-dihydro-2,2,4-trimethyl quinoline. | 1.0 | Post addition. |
| G. 1,3,5-tris (3,5-di tert. butyl-4-hydroxy hydrocinnamoyl) hexahydro-s-triazine. | 1.0 | Addition with starting materials. |

The antioxidants used for the preparation of polymer composition 2F and 2G are outside of the scope of this invention and are included for comparison.

For control purposes the preparation of above polymer compositions is essentially repeated except that Nickel Stabilizer A is omitted. The heat aging characteristics of the Nickel Stabilizer A containing compositions at 177° C. and 150° C., respectively, are compared with the performance of the nickel-free polymers. The results are summarized in Table III.

TABLE III

| Composition | Nickel Stabilizer A containing polymers | Control (without Nickel Stabilizer A) |
|---|---|---|
| | Polymer life* at 177° C. (days) | |
| A | 7 | 3 |
| B | 6 | 3 |
| C | 7 | 3 |
| D | 7 | 4 |
| E | 4 | 3 |
| F | 4 | 4 |
| | Polymer life [1] at 150° C. (days) | |
| G | 14 | 14 |

[1] Based on 180° Bend Test.

It is evident from the data shown in Table III that only diarylamine type antioxidants are effective when used in combination with Nickel Stabilizer A.

Substantially the same results are obtained when Example 2 is repeated with the corresponding polyethylene oxide glycol or polypropylene oxide glycol based copolyesters instead of Copolyester B.

Example 3

455 parts of dry Copolyester C and 4.55 parts of Nickel Stabilizer A are dry-blended and mixed in a single screw extruder at 220° C. (3A). For control purposes unmodified Copolyester C is used (3B).

Dumbbell shaped test specimen died out from 80 mil compression molded slabs are aged for 14 days at 150° C., immersed in ASTM No. 1 oil. The physical properties before and after aging are given in Table IV.

TABLE IV

| | 3A | Control 3B |
|---|---|---|
| Original properties [1] | | |
| $M_{100}$, p.s.i | 2,250 | 2,100 |
| $M_{300}$, p.s.i | 2,550 | 2,360 |
| $T_B$, p.s.i | 6,100 | 5,900 |
| $E_B$, percent | 720 | 710 |
| Properties [1] at 25° C. after immersion for 14 days at 150° C. in ASTM No. 1 Oil: | | |
| $M_{100}$, p.s.i | 2,350 | |
| $T_B$, p.s.i | 2,620 | 1,120 |
| $E_B$, percent | 270 | 10 |
| 180° Bend Test | Passed | Failed |

[1] Crosshead speed 20"/min.

What is claimed is:

1. A stabilized copolyetherester composition consisting essentially of (a) a copolyetherester having a multiplicity of recurring long chain ester units and short chain ester units joined head-to-tail through ester linkages, said long chain ester units being represented by the formula I 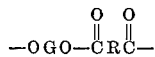

and said short chain units being represented by the formula

II 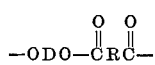

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a didicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyetherester; said copolyetherester being stabilized against thermal degradation by the inclusion therein of a mixture of (a) a 0.2–5 weight percent of a diaryl amine and
(b) 0.1–3 weight percent of a nickel salt of a Schiff base derived from salicyl aldehyde and an aromatic amine or amino pyridine, said weight percentages being based on the weight percent of copolyetherester.

2. The composition of Claim 1 wherein the diaryl amine has the general formula Ar NH Ar[1], wherein Ar and Ar[1] are selected independently from the group consisting of phenyl, substituted phenyl, α or β-naphthyl or substituted α or β-naphthyl radicals.

3. The composition of Claim 1 wherein the diaryl amine is 4,4'-bis(α,α-dimethylbenzyl)diphenylamine.

4. The composition of Claim 1 wherein component C) is a nickel salt of a compound having the general formula

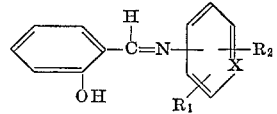

wherein $R_1$ and $R_2$ are independently selected from the group consisting of hydrogen, halogen, $C_1$ to $C_6$ alkyl, $C_1$ to $C_6$ alkoxy and $C_2$ to $C_7$ carboalkoxy and X is CH or N.

5. The composition of Claim 4 wherein the nickel salt is derived from salicylidene-2-chloroaniline.

6. The composition of Claim 1 wherein said poly(alkylene-oxide) glycol is poly(tetramethylene oxide) glycol having a molecular weight of 600–2000, the diol is 1,4-butanediol and the dicarboxylic acid is a mixture of dimethylterephthalate and phthalate.

7. The composition of Claim 6 wherein said dicarboxylic acid is dimethyl terephthalate.

8. A process for producing the composition of Claim 1 which comprises reacting said poly(alkylene oxide) glycol, said dicarboxylic acid and said diol in the presence of said diaryl amine to form the copolyetherester and subsequently adding the nickel salt of the Schiff base.

References Cited
UNITED STATES PATENTS

| 3,023,192 | 2/1962 | Shivers | 260—75 |
| 3,649,690 | 3/1972 | Wheeler | 260—45.9 |
| 3,303,162 | 2/1967 | Fuchsman | 260—45.75 |
| 2,615,860 | 10/1952 | Burgess | 260—45.75 |

OTHER REFERENCES

Journal, American Chemical Society, vol. 73, pp. 5660 and 5661; 1952.

V. P. HOKE, Primary Examiner

U.S. Cl. X.R.
260—45.9 QB